June 15, 1943.  M. B. KENDIS  2,321,822

LENS DRILLING MECHANISM

Filed July 5, 1941  4 Sheets-Sheet 1

INVENTOR.
Michael B. Kendis
BY Warren D. House
His ATTORNEY.

June 15, 1943.  M. B. KENDIS  2,321,822
LENS DRILLING MECHANISM
Filed July 5, 1941  4 Sheets-Sheet 2

INVENTOR.
Michael B. Kendis
BY Warren D. House
His ATTORNEY.

June 15, 1943.  M. B. KENDIS  2,321,822
LENS DRILLING MECHANISM
Filed July 5, 1941  4 Sheets-Sheet 3
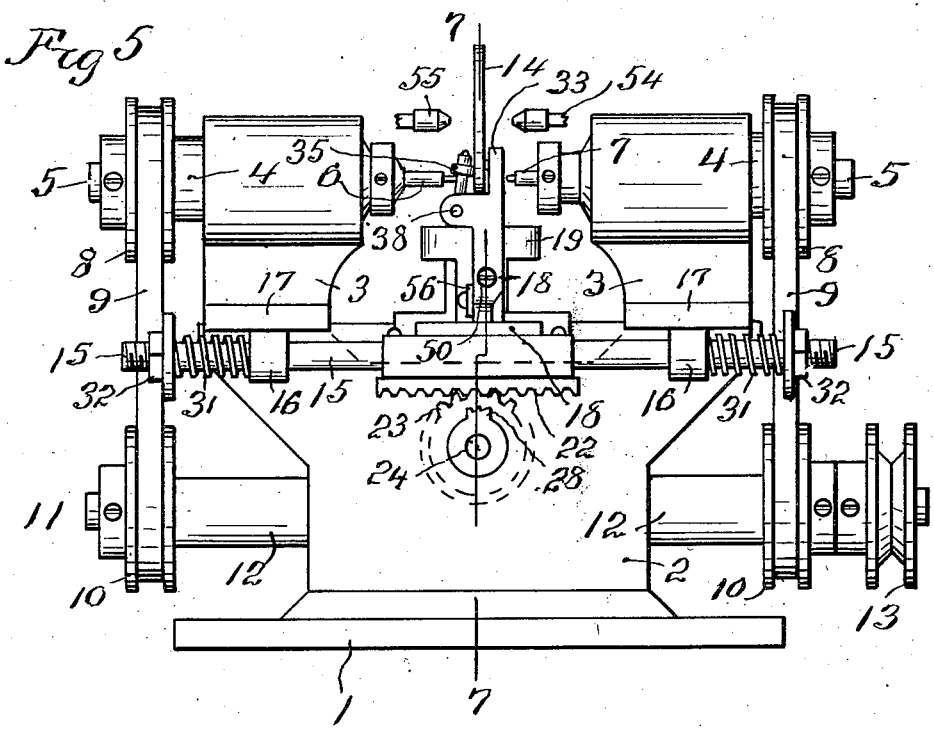
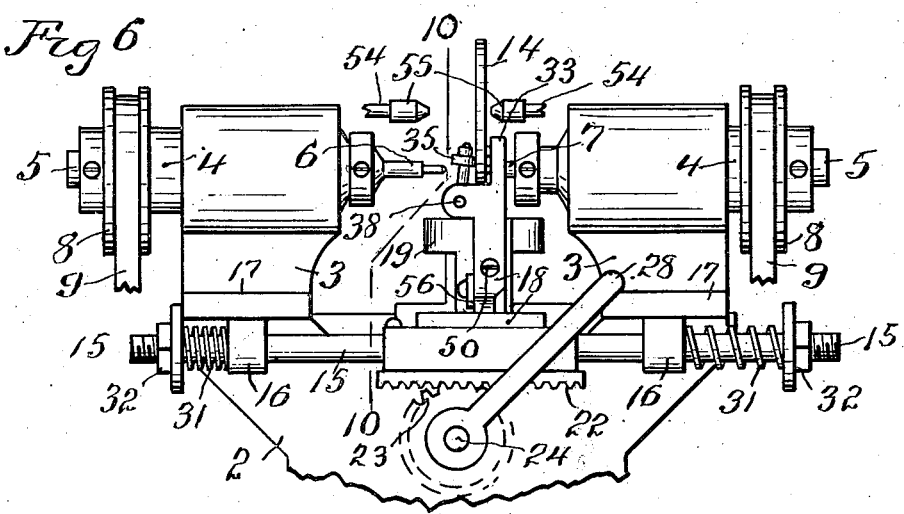
INVENTOR.
Michael B. Kendis
BY Warren D. House
His ATTORNEY.

June 15, 1943. M. B. KENDIS 2,321,822
LENS DRILLING MECHANISM
Filed July 5, 1941 4 Sheets-Sheet 4
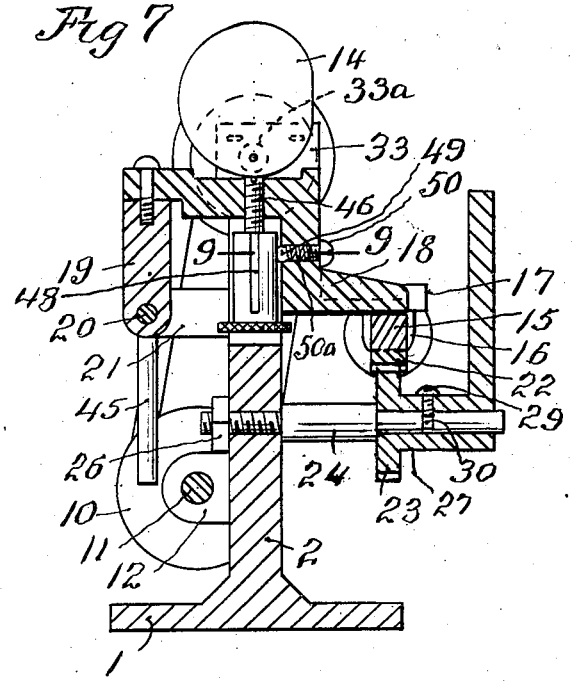
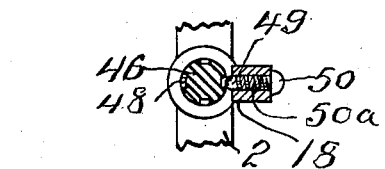
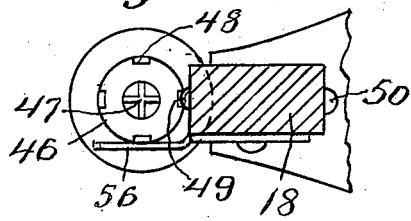
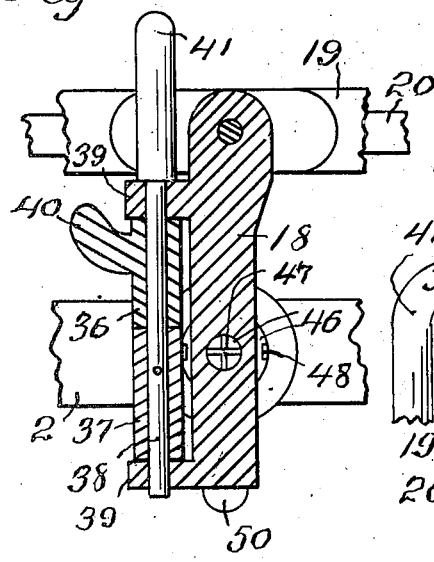
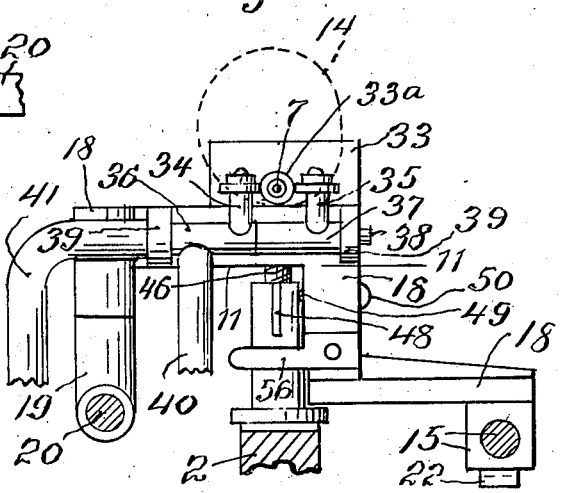
INVENTOR
Michael B. Kendis
BY Warren D. House
His ATTORNEY Patented June 15, 1943

2,321,822

UNITED STATES PATENT OFFICE 2,321,822

LENS DRILLING MECHANISM

Michael B. Kendis, Kansas City, Mo.

Application July 5, 1941, Serial No. 401,126

9 Claims. (Cl. 77—21)

My invention relates to improvements in lens drilling mechanisms. In the usual drilling of lenses it is customary to drill a hole partly through from one side, and then to reverse the lens and drill from the other side to connect with the first hole. It is difficult to properly position for the second drilling, so that often the two holes do not properly aline, and reaming is required.

One of the objects of my invention is to provide a novel drilling mechanism, which will drill the lens with one positioning, so that the two holes drilled will properly aline and will eliminate reaming.

Another object of my invention is the provision of a novel lens drilling mechanism, which is simple, strong, durable, in which the lens to be drilled can be easily, quickly and firmly secured in the position in which it is to be drilled, which is easily and quickly operated, which is not liable to get out of order, and which is efficient in its operation.

The novel features of my invention are hereinafter fully described and claimed.

In the accompanying drawings, which illustrate the preferred embodiment of my invention, Fig. 1 is a top view, partly broken away of my improved lens drilling mechanism, showing the lens mounted on the carriage with the latter in the medial position, and the lens disposed between and spaced apart from the two drills.

Fig. 5 is an elevation view, looking at the side of the mechanism shown in Fig. 2, but showing more of the same, with the carriage shown in the medial position, and the lens spaced from the drills.

Fig. 6 is a side elevation similar to Fig. 2, but showing the carriage moved to a position in which the lens is operatively engaged with the other drill, parts being omitted and others broken away.

Fig. 7 is a section on the line 7—7 of Fig. 5.

Fig. 8 is a section on the line 8—8 of Fig. 4.

Fig. 9 is a section, enlarged, on the line 9—9 of Fig. 7.

Fig. 10 is an enlarged section on the line 10—10 of Fig. 6.

Fig. 11 is an enlarged section on the line 11—11 of Fig. 10, the lens supporting screw being shown in plan.

Similar characters of reference designate similar parts in the different views.

Figure 1:
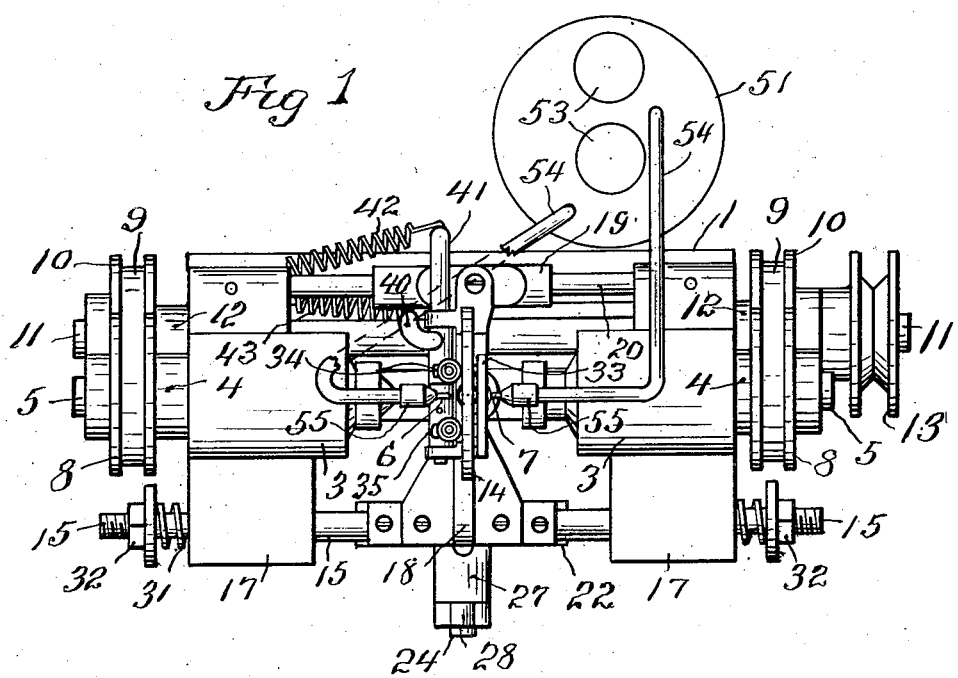

The support of the mechanism comprises a flat base 1 from which extends upwardly an intermediate portion 2, from which upwardly extend two arms 3 having within them respectively two bearings 4 in which are rotatably mounted two axially alined horizontal shafts 5, having spaced apart ends in which are respectively removably fastened two oppositely disposed longitudinally alined spaced apart drills 6 and 7.

For rotating the shafts 5, they have fastened respectively to them two pulleys 8 connected respectively by two belts 9 to two pulleys 10 fastened on a longitudinal driving shaft 11 rotatable in bearings 12 oppositely extending from the portion 2 of the support. Fastened on the shaft 11 is a pulley 13 which may be driven from any suitable source of power, not shown.

For supporting the lens 14 to be ground, there is provided a reciprocative carriage, comprising the following described parts:

A longitudinal bar 15, parallel with the shafts 5, is slidably mounted in two bearings 16 depending from two shelf like projections 17, extending from one side of the portion 2 of the support. Rigidly fastened to the bar 15 on the upper side thereof, is a member 18 Z shaped in cross section, Fig. 7, which extends over the base portion 2 between the portions 3, and having fastened to its other end, a downwardly extending inverted T shaped member 19 which is longitudinally slidably mounted on a longitudinal bar 20 fastened in bearings 21 projecting from the side of the base portion 2, opposite to that from which extend the projections 17, Figs. 1, 3, 4 and 7.

The carriage comprising the bar 15, and members 18 and 19, all rigidly fastened together is reciprocated parallel with the axis of the shafts 5, by a longitudinal rack 22 fastened to the under side of the member 18, in which meshes a gear 23, oscillative on a bar 24, having a threaded end portion 25 extending through the base portion 2, Fig. 7, and having a fastening nut 26, bearing against the portion 2. The gear 23 has a hub 27 from which extends a crank 28. A screw 29 mounted in a threaded hole in the hub 27, extends into a peripheral groove 30 in the bar 24, holding the gear on the bar 24, but permitting the oscillation of the gear.

By oscillating the crank 28, the carriage is reciprocated. To automatically always return the carriage to the medial position, shown in Figs. 1, 3 and 5, two coiled springs 31 encircle the bar 15, and have their adjacent ends bearing respectively against distant sides of the bearings 16, and their distant ends bearing respectively against two nuts 32, mounted on the threaded ends of the bar 15. The tension of the springs 31 retract the carriage bar 15 and its attached parts to the medial position.

Figure 2:
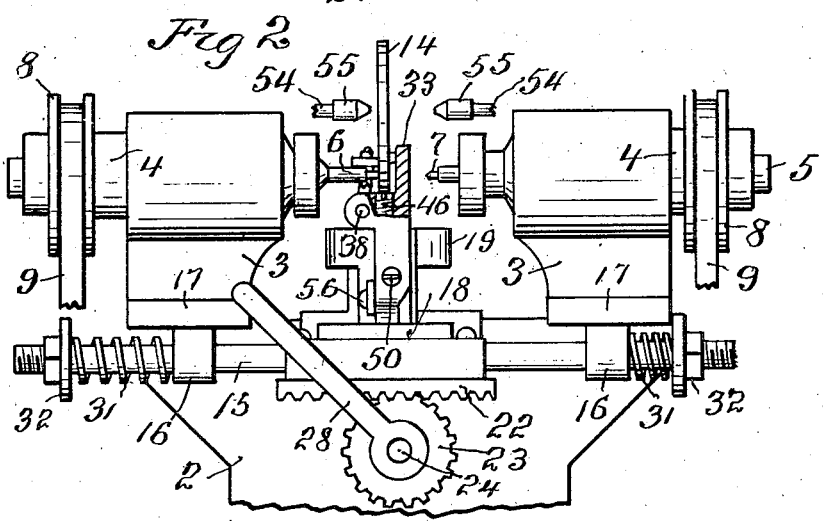
Fig. 2 is an elevation view looking at one side of the mechanism, parts being removed and parts broken away, showing the mounted lens operatively engaged by one of the two drills.
Figure 3:
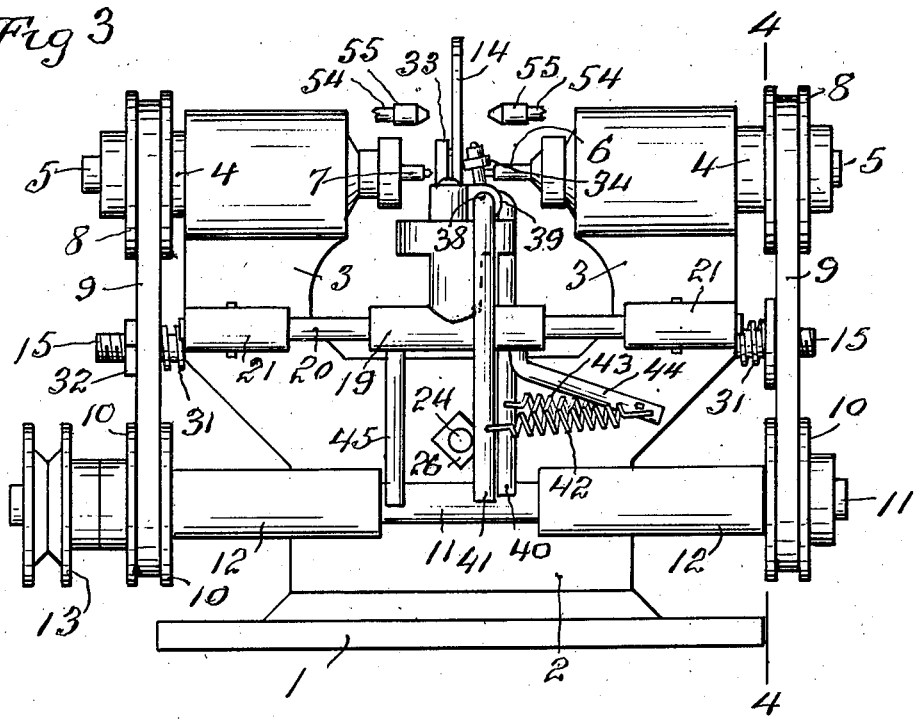
Fig. 3 is an elevation view looking at the opposite side of the mechanism, parts being omitted, and the mounted lens disposed between and spaced from the drills.
Figure 4:
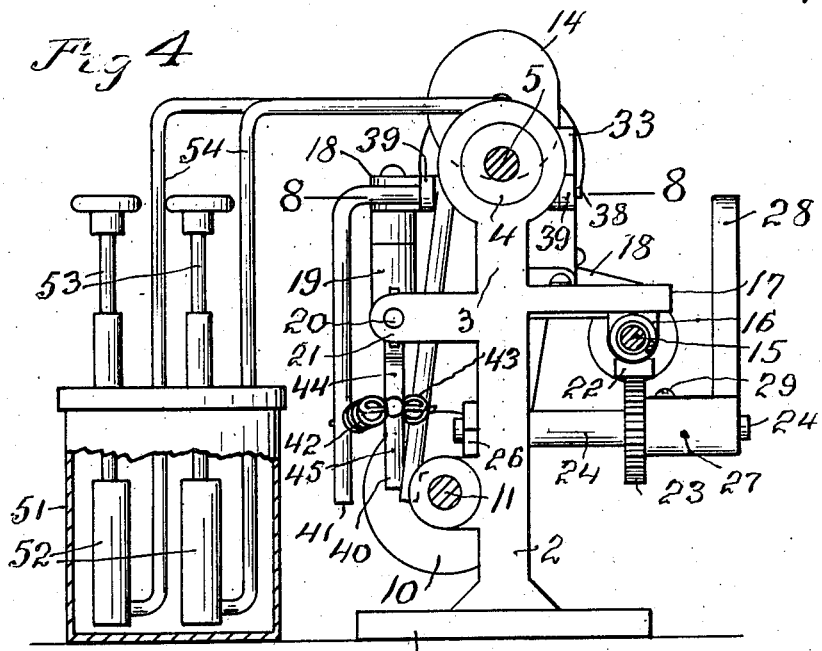
Fig. 4 is a section on the line 4—4 of Fig. 3.

Upstanding from the carriage member 18 is a flange 33 forming an abutment against which one side of a lens 14 is adapted to bear, Figs. 1 and 2. The lens is releasably yieldingly held against the abutment 33 by two arms 34 and 35 respectively provided on two sleeves 36 and 37 mounted on a transverse rock shaft 38 mounted in bearings 39 on the carriage member 18, Fig. 10. The sleeve 36 is oscillative on the rock shaft 38, and the sleeve 37 is fixed on the rock shaft 38.

Fastened to the sleeve 36 is a crank 40. The rock shaft 38 has a crank 41. Two helical springs 42 and 43 are respectively fastened to the cranks 41 and 40, their other ends being fastened to a rod 44 carried by and extending downwardly from the carriage member 19, Figs. 3 and 4.

The arms 34 and 35 are disposed at opposite sides of the axis of the drills 6 and 7, and yielding press against the lens 14, thus holding it against the abutment flange 33.

Extending downwardly from the carriage member 19 is a rod 45. By engaging the forefinger of the hand with the rod 45, the cranks 41 and 40 may be swung, against the tension of the springs 42 and 43, so as to release the lens 14 from the arms 34 and 35. When the cranks 41 and 40 are released the springs 42 and 43 retract the arms to their operative positions against a lens 14 bearing against the abutment 33. A hole 33a through the flange 33 admits the drills.

For supporting the lens 14 in proper position for being drilled alternately at opposite sides by the drills 6 and 7, there is provided a vertical screw 46 vertically adjustably fitted in a vertical threaded hole in the member 18 of the carriage, Figs. 2, 7, 10 and 11.

The screw 46 has its axis intersecting the axis of the drills 6 and 7, and it is disposed in a transverse plane between the drills and at one side of the abutment 33, and between the arms 34 and 35. The arms 34 and 35 are independent of each other, to accommodate them to the shape of the lens 14.

For properly positioning the lens 14, the upper end of the screw 46 has lens positioning indicating means comprising, as shown a representation of a cross, the cross lines of which, by adjusting the screw, may be brought into alinement with the longitudinal plane of the axis of the drills 6 and 7. The lens 14 is adapted to rest on top of the screw 46, so as to be raised or lowered to the desired position vertically, and the cross lines serve as guides for lateral positioning. They are indicated by 47.

The place on the lens where the hole is to be made may be previously marked, and the positioning may then be determined, by suitable adjustment of the screw 46 and the lens, and the lens then held in proper position by the arms 34 and 35 holding it tightly against the abutment 33.

The carriage is then moved by means of the crank 28, to cause the gear 23 to move the rack 22 in the proper direction from the medial, so as to bring one side of the lens against one of the drills 6 or 7, as the case may be. After a hole has been bored partly through the lens 14, the crank 28 is reversed, so as to move the carriage to cause the other side of the lens to be operatively engaged with the other drill. The boring of the hole is completed with the last named drill. The hole will be smooth and will not need reaming, and the boring will be easily and quickly effected without having to readjust the lens.

To releasably hold the screw 46 from turning accidentally from its adjusted position, the periphery of the enlarged smooth lower portion of the screw 46 has four longitudinal grooves 48, which respectively aline with the planes of the lines of the cross representation 47, and into each of which is adapted to enter a ball 49 projecting from a transverse hole in the member 18.

The other end of the hole is threaded and has fitted in it a screw 50. A coil spring 50a in the hole has its ends bearing against the ball 49 and the screw 50, the tension of the spring holding the ball in the groove 48 in which it at the time is disposed.

The lower end of the screw 46 is enlarged and knurled, to enable the operator to easily adjust the screw, Figs. 7, 9, 10 and 11.

For projecting a liquid lubricant on opposite sides of the lens 14, during the drilling operation, there is provided, Figs. 1, 2, 3 and 4, an oil container 51, having in it the cylinders 52 of two piston pumps, the piston rods 53 of which project through the top of the oil container 51. Two discharge pipes 54 respectively connecting with the cylinders 52, are positioned with their discharge nozzles 55 directed toward opposite sides of the lens 14, and disposed adjacent thereto to discharge thereagainst above where the hole is being bored through the lens.

By operating the piston rods 53, the oil in the container 51 may be discharged as desired against the lens.

A spring strip 56 fastened to the carriage member 18 bears against the grooved periphery of the screw 46 and aids in yieldingly holding the screw from accidental turning.

Many modifications of my invention, within the scope of the appended claims, may be made without departing from the spirit of my invention.

What I claim is:

1. In a lens drilling mechanism, a support, two oppositely disposed longitudinally alined spaced apart drills, means on said support for supporting said drills, means oscillative on said support for supporting a lens between said drills, and for alternately bringing opposite sides of said lens into operative engagement with said drills, and means for automatically forcing said lens supporting means to a position in which the lens will be between and spaced from said drills.

2. In a lens drilling mechanism, a support, two oppositely disposed longitudinally alined spaced apart drills, means on said support for rotatably supporting said drills, means oscillative on said support parallel with the axis of said drills for supporting a lens between said drills, and when reciprocated, for bringing opposite sides of the lens alternately into operative engagement with said drills, means for reciprocating manually said lens supporting means, and means for automatically moving to and releasably holding said lens holding means in a position with the lens disposed between and apart from said drills.

3. In a lens drilling mechanism, a support, two oppositely disposed longitudinally alined spaced apart drills, means on said support for rotatably supporting said drills, a carriage reciprocative on said support parallel with the axis of said drills, means for reciprocating said carriage, an abutment on said carriage between and spaced from said drills, a rock shaft on said carriage having a crank and provided with an arm, a sleeve pivoted on said rock shaft and having a crank, said arms being disposed at opposite sides of the axis of said drills and adapted to independently bear against a lens and hold the lens against said abutment between said drills, said carriage, when reciprocated, being adapted to move said abutment to bring opposite sides of the lens so held alternately into operative engagement with said drills, and means for normally swinging said cranks to swing said arms into holding engagement with the lens against said abutment.

4. In a lens drilling mechanism, a support, two oppositely disposed longitudinally alined spaced apart drills, means on said support for rotatably supporting said drills, a carriage reciprocative on said support parallel with the axis of said drills, means on said carriage for holding a lens between and spaced from said drills when said carriage is in a medial position, said carriage, when reciprocated, being adapted to bring opposite sides of the lens alternately into operative engagement with said drills, and means for normally automatically moving said carriage to said medial position.

5. In a lens drilling mechanism, two oppositely disposed longitudinally alined spaced apart drills, a support, means on said support for rotatably supporting said drills, a carriage reciprocative on said support parallel with the axis of said drills and having a longitudinal rack, means on said carriage for supporting a lens between and spaced from said drills when said carriage is in a medial position, said carriage, when reciprocated being adapted to bring the opposite sides of the lens alternately in operative engagement with said drills, a gear meshing with said rack, means for oscillating said gear, and resilient means normally forcing said carriage automatically to said medial position.

6. In a lens drilling mechanism, a support, two oppositely disposed longitudinally alined spaced apart drills, means for rotatably supporting said drills on said support, a carriage reciprocative on said support parallel with the axis of said drills and having a longitudinal rack, means on said carriage for supporting a lens between and spaced from said drills when said carriage is in a medial position, said carriage, when reciprocated, being adapted to bring opposite sides of the lens alternately into operative engagement with said drills, a gear meshing with said rack, means for oscillating said gear, and means for automatically normally moving said carriage to said medial position.

7. In a lens drilling mechanism, a support, two oppositely disposed longitudinally alined spaced apart drills, means for rotatably supporting said drills on said support, a carriage reciprocative on said support parallel with the axis of said drills, an abutment on said carriage against which a lens is adapted to bear when said lens is positioned between said drills, and two independent means for releasably engaging the lens at opposite sides of the axis of said drills for holding the lens against said abutment, said carriage, when reciprocated, being adapted to bring opposite sides of the lens alternately into operative engagement with said drills.

8. In a lens drilling mechanism, a support, two oppositely disposed longitudinally alined spaced apart drills, two members rotatable on said support respectively supporting said drills, a carriage reciprocative on said support parallel with the axis of said drills, holding means on said carriage against which a lens is adapted to bear and to be held between and spaced from said drills when said carriage is in a medial position, and two means for releasably bearing against the lens at opposite sides respectively of the axis of said drills so as to hold the lens against said holding means, said carriage, when reciprocated being adapted to bring opposite sides of the lens alternately into operative engagement with said drills.

9. In a lens drilling mechanism, a support, two oppositely disposed longitudinally alined spaced apart drills, two members rotatable on said support respectively supporting said drills, a carriage reciprocative on said support parallel with the axis of said drills, holding means on said carriage against which a lens is adapted to bear and to be held between and spaced from said drills when said carriage is in a medial position, two means for yieldingly releasably bearing against the lens at opposite sides of the axis of said drills for holding the lens against said holding means, said carriage, when reciprocated being adapted to bring opposite sides of said lens alternately into operative engagement with said drills, means for reciprocating said carriage, and means for automatically moving said carriage normally to said medial position.

MICHAEL B. KENDIS.